(12) United States Patent
Verhaeghe

(10) Patent No.: US 7,156,422 B2
(45) Date of Patent: Jan. 2, 2007

(54) UNDERCARRIAGE FOR A VEHICLE AND METHOD FOR MANUFACTURING LONGITUDINAL BEAMS FOR IT

(75) Inventor: Jan Jozef Verhaeghe, Beveren (BE)

(73) Assignee: Groep Stevens International, naamloze vennootschap, Beveren (BE)

( * ) Notice: Subject to any disclaimer, the term of this patent is extended or adjusted under 35 U.S.C. 154(b) by 120 days.

(21) Appl. No.: 10/169,106

(22) PCT Filed: Jan. 4, 2001

(86) PCT No.: PCT/BE01/00001

§ 371 (c)(1),
(2), (4) Date: Jan. 15, 2002

(87) PCT Pub. No.: WO01/51338

PCT Pub. Date: Jul. 19, 2001

(65) Prior Publication Data
US 2003/0001376 A1    Jan. 2, 2003

(30) Foreign Application Priority Data
Jan. 13, 2000 (BE) .................. 2000/0026

(51) Int. Cl.
B62D 21/20 (2006.01)
(52) U.S. Cl. .................... 280/789; 280/781
(58) Field of Classification Search ............... 280/789, 280/799, 798, 797, 781; 29/897.2
See application file for complete search history.

(56) References Cited

U.S. PATENT DOCUMENTS

| | | | | |
|---|---|---|---|---|
| 3,705,732 A | * | 12/1972 | Marinelli | 280/789 |
| 4,180,172 A | * | 12/1979 | Torneback | 414/522 |
| 4,516,648 A | * | 5/1985 | Berger et al. | 180/6.66 |
| 4,938,524 A | * | 7/1990 | Straub et al. | 296/181 |
| 5,211,413 A | * | 5/1993 | Williams et al. | 280/149.2 |
| 5,819,408 A | * | 10/1998 | Catlin | 29/897.2 |
| 5,865,362 A | * | 2/1999 | Behrmann et al. | 228/114.5 |
| 5,880,394 A | * | 3/1999 | Kim | 89/36.02 |
| 6,158,773 A | * | 12/2000 | Verhaeghe | 280/787 |
| 6,308,412 B1 | * | 10/2001 | Christofaro et al. | 29/897.2 |
| 6,543,404 B1 | * | 4/2003 | Jones et al. | 123/184.61 |
| 6,634,673 B1 | * | 10/2003 | Verhaeghe | 280/781 |
| 6,688,680 B1 | * | 2/2004 | Cooper et al. | 296/208 |
| 2003/0001376 A1 | * | 1/2003 | Verhaeghe | 280/781 |
| 2003/0184074 A1 | * | 10/2003 | Verhaeghe | 280/789 |

FOREIGN PATENT DOCUMENTS

WO    WO 9748589    * 12/1997

* cited by examiner

Primary Examiner—Michael J. Carone
Assistant Examiner—Bret Hayes
(74) Attorney, Agent, or Firm—Bacon & Thomas, PLLC

(57) ABSTRACT

An undercarriage for a vehicle including at least two longitudinal beams, at least one transverse beam and at least one wheel axle. The height of the foremost part of the longitudinal beams has a reduction in height that defines a swan-neck. The longitudinal beams are made of a composite material including a thermoplastic synthetic material with reinforcing fibers. The height of the foremost part of the longitudinal beams is reduced by means of plastic deformation.

10 Claims, 4 Drawing Sheets

UNDERCARRIAGE FOR A VEHICLE AND METHOD FOR MANUFACTURING LONGITUDINAL BEAMS FOR IT

The invention relates to an undercarriage for a vehicle, which undercarriage is of the type with a swan-neck, and comprises at least two longitudinal beams, the height of the foremost part of the longitudinal beams being reduced in height, said swan-neck being thus formed by a change in height of the longitudinal beams; at least one transverse beam and at least one wheel axle, whereby at least the longitudinal beams are made of a composite material consisting of synthetic material with reinforcing fibres.

By vehicle, here a towed vehicle as well as an automotive vehicle is intended, with at least one axle at both extremities as well as with at least one axle only at the rear extremity.

In particular, but not exclusively, the invention relates to a semitrailer, with one or more axles at the rear extremity.

Such undercarriage for a vehicle is described in the international patent application no. 97/48589.

The longitudinal beams, and preferably also the transverse beams and the trestles with which the wheel axles possibly are connected to the longitudinal beams, are made of a thermosetting resin, to wit polyester, reinforced with glass fibres, carbon fibres, aramide fibres and the like.

Such composite materials, however, show a sensitivity to ageing, and after a certain period of time, the beams and other parts consisting of such composite materials will show microscopic cracks.

Further, such composite materials are difficult to recycle.

The fixation of the transverse beams and the trestles at the longitudinal beams is performed by means of glue, as a result of which the connections are difficult to inspect.

The deformation of a longitudinal beam, which in most cases is made by pultrusion and which consists of a composite material with a thermosetting synthetic material, is difficult, as a result of which it is not possible to manufacture a semitrailer with a so-called swan-neck part in an economic manner.

The invention has as an aim to remedy these disadvantages and to provide an undercarriage having good mechanical properties which also will be maintained after a certain period of time, which undercarriage may comprise other connections than glue connections and which can be brought into the desired form more easily According to the invention, this aim is achieved in that the synthetic material of the composite material, of which at least the longitudinal beams are made, is a thermoplastic synthetic material, and in chat the height of the foremost part of the longitudinal beams is reduced by means of plastic deformation.

As the composite material comprises thermoplastic synthetic material, it may in fact easily be made deformable by being heated.

Preferably, the longitudinal beams have two lateral flanks and, at the foremost part of these beams, the upright lateral flanks bend out or bulge, preferably outwardly, due to a thermoplastic deformation.

At the foremost part of the beams, the upright lateral flanks preferably bend out so that two adjacent longitudinal portions of each flank are in contact with each other. These portions may be glued or welded together.

Suitable synthetic materials are polypropylene and polyamide.

Preferably, also the transverse beam is made of composite material with thermoplastic synthetic material and, in the case that the wheel axle is connected to a longitudinal beam by the intermediary of a trestle, according to a particular form of embodiment also this trestle consists of composite material with thermoplastic synthetic material.

The transverse beam and, possibly, the trestles may be glued to the longitudinal beam, however, preferably are welded thereto.

The invention also relates to a method which is particularly suitable for manufacturing longitudinal beams for the aforementioned undercarriage with swan-neck part.

Thus, the invention relates to a method for manufacturing a longitudinal beam for an undercarriage for a vehicle with swan-neck part, which longitudinal beam comprises a hollow core with lateral flanks, according to which method the longitudinal beam is made of a synthetic material and reinforcing fibres, with a constant cross-section over its length, and which is characterised in that the longitudinal beam is made of a thermoplastic synthetic material with reinforcing fibres, first with a constant cross-section, and that it subsequently is locally heated until it can be deformed and that it finally, under the influence of pressure, is deformed such that the lateral flanks thereof bend out or bulge such that the height thereof is reduced.

With the intention of better showing the characteristics of the invention, hereafter, as an example without any limitative character, some preferred forms of embodiment of an undercarriage and of a method for manufacturing a longitudinal beam for it according to the invention is described, with reference to the accompanying drawings, wherein:

FIG. 1 represents a vehicle with an undercarriage according to the invention;

FIG. 2, at a larger scale, represents the portion which is indicated by F2 in FIG. 1;

FIG. 3 in perspective represents the cross-section according to line III—III in FIG. 2;

FIG. 4, at a larger scale, represents a cross-section according to line IV—IV in FIG. 1;

Figure 3:
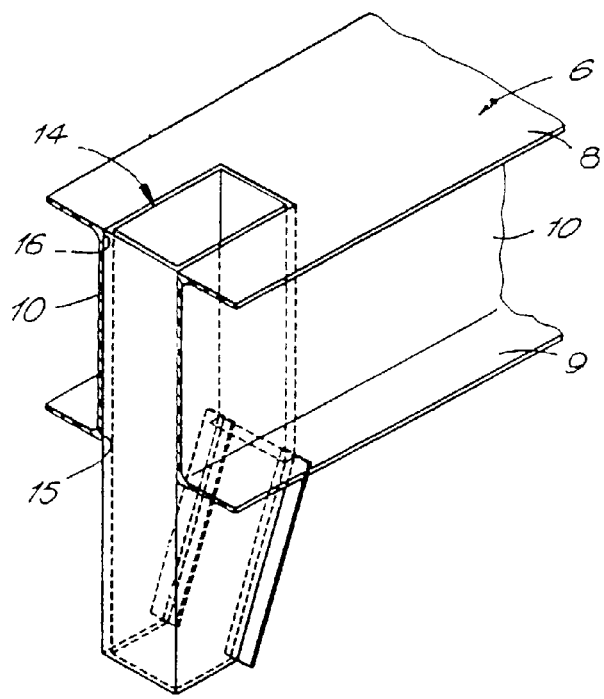
Figure 11:
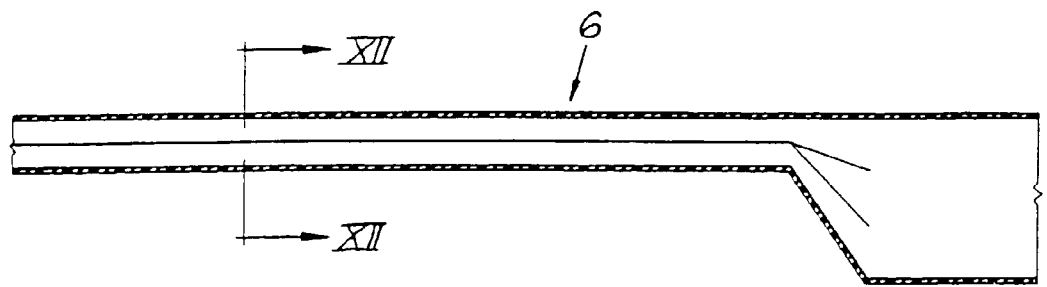
FIG. 11 represents a cross-section similar to the one of FIG. 10, but pertaining to another form of embodiment of the invention.
Figure 12:
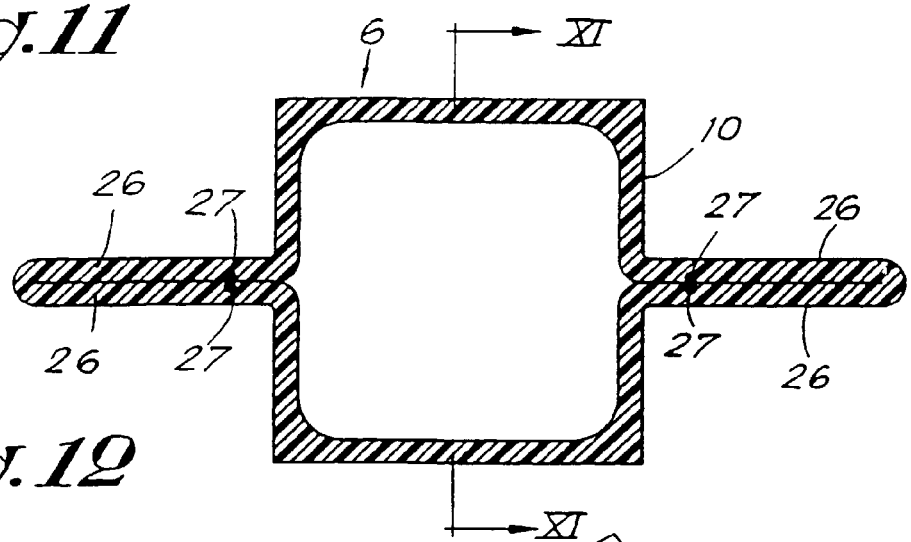
FIG. 12 represents a cross-section according to line XII—XII in FIG. 11, on a larger scale.
Figure 13:
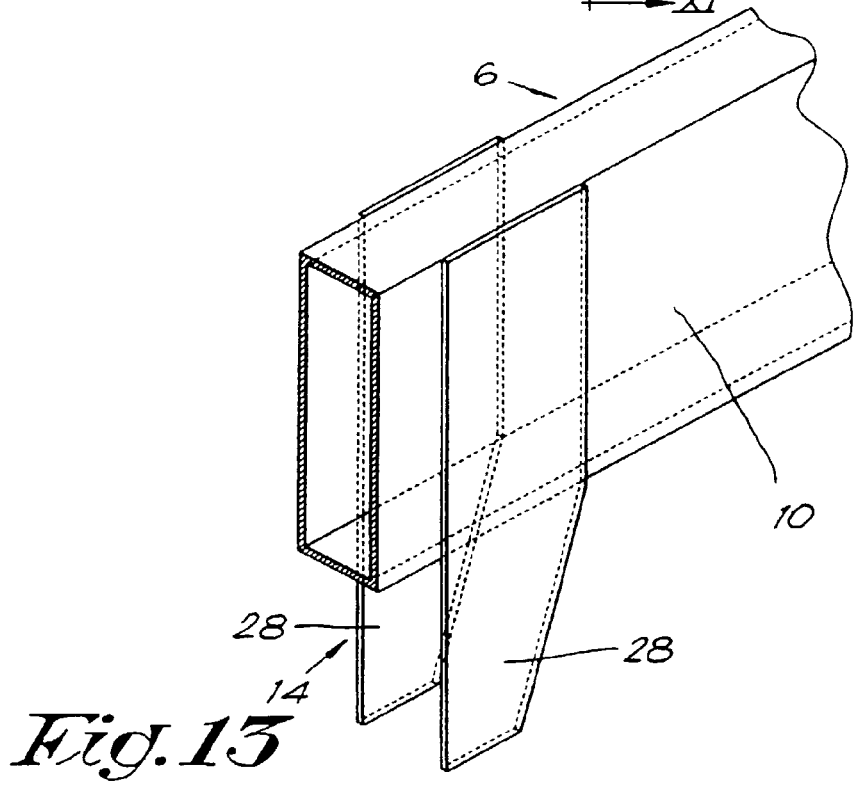

FIG. 13 in perspective represents a cross-section similar to the one of FIG. 3, but pertaining to the embodiment of FIGS. 11 and 12.

Figure 1:
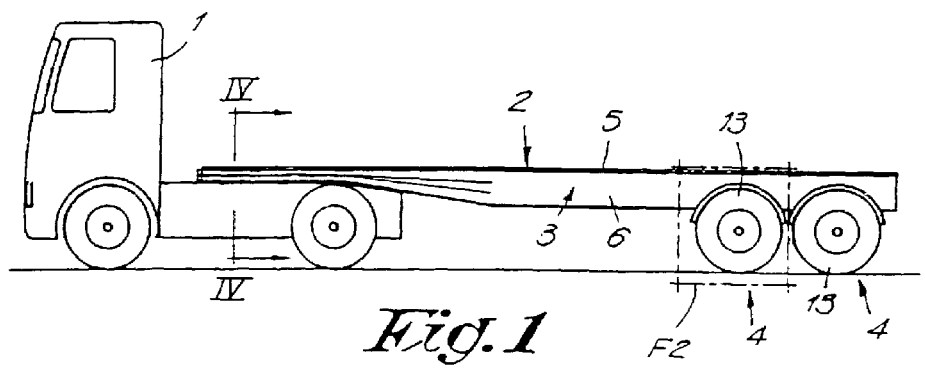

In FIG. 1, a combination is represented of a truck tractor 1 with a vehicle according to the invention, which forms a semitrailer 2, whereby the semitrailer 2 is of the type with a so-called swan-neck and consists in a usual manner of a chassis 3 which at the rear rests on two wheel sets 4 and upon which a floor 5 and/or a non-represented superstructure are provided.

The chassis 3 substantially is formed of two hollow longitudinal beams 6 and transverse beams 7 mounted in between them.

The longitudinal beams 6 as well as the transverse beams 7 are made of composite material which consists of thermoplastic synthetic material reinforced with fibres.

Suitable thermoplastic synthetic materials are, amongst others, polypropylene and polyamide, whereas suitable reinforcing fibres are, amongst others, glass fibres, carbon fibres, kevlar fibres or aramide fibres.

The longitudinal beams 6 have an I-profile with a hollow core and consist of an upper flange 8, a lower flange 9 and two lateral flanks 10 situated in between. They may be composed of several base profiles fixed to each other, as well as consist of one single piece, such as in the represented example.

These longitudinal beams 6 are manufactured, for example, by means of techniques such as "continuous compressing moulding".

Figure 2:
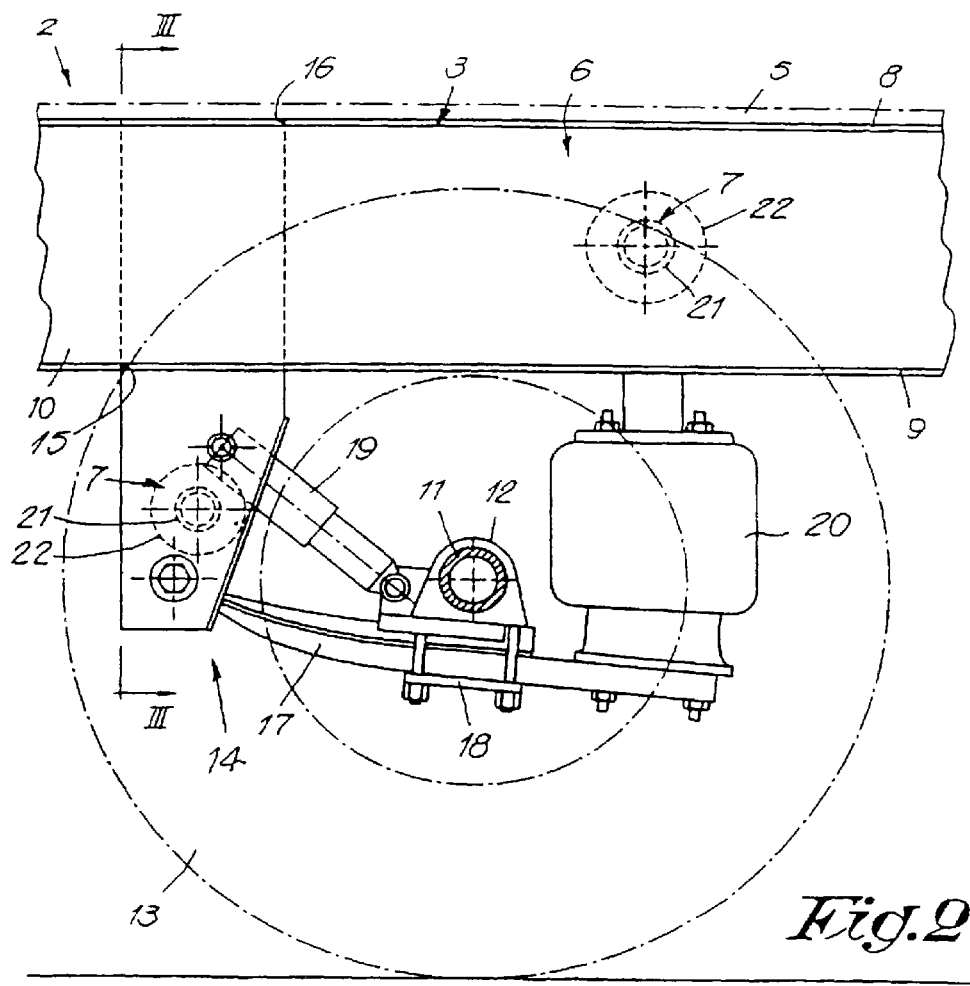

As represented in detail in FIG. 2, the wheel sets 4 substantially consist of a wheel axle 11 which is borne in bearings 12 which are connected to the chassis 3 in a springy manner, and of wheels 13 attached to the extremities of the wheel axle 11.

The springy mounting of each bearing 12 in respect to a longitudinal beam 6 is performed, as represented in detail in FIG. 2, by the intermediary of a fixation part, a so-called trestle 14 which is situated with its upper portion between the two lateral flanks 10 of the longitudinal beam 6, at the location of an interruption 15 in the lower flange 9 and, possibly, also of an interruption 16 in the upper flange 8 of this longitudinal beam 6.

Said trestle 14 has the shape of a tubular element which reaches up to the upper edge of the longitudinal beam 6 and which, below this longitudinal beam 6, is chamfered at the rear side.

The trestle 14 may be manufactured of steel or aluminium, however, preferably it is also made of composite material with a thermoplastic synthetic material, for example, by the so-called "hand lay-up" method or by forming under heat and pressure, the so-called "compressing moulding". This last-mentioned technique consists in bringing the synthetic material and the reinforcing fibres or a mat of pre-impregnated fibres into a heated mould and subsequently pressing the mixture of polymer and reinforcing material into the desired form, by means of a high pressure of, for example, approximately 100 ton per m$^2$.

The extremity of the trestle 14 situated between the lateral flanks 10 is fixed to these lateral flanks 10 with two flat lateral walls, for example, glued thereto, but preferably welded. Possibly, the fixation still can be reinforced by bolts.

Below the longitudinal beam 6, the trestle 14 may widen somewhat.

At the lowest extremity of the trestle 14, a leaf spring 17 is fixed, possibly in a hingeable manner. At a distance from the trestle 14, the bearing 12 is fixed upon the leaf spring 17 by means of fixation means 18.

Between the bearing 12 and a location of the trestle 14 situated below the longitudinal beam 6, a shock absorber 19 is provided, whereas between the free extremity of the leaf spring 17 and the longitudinal beam 6, an air bellows 20 is situated which is connected to a source of compressed air in a manner which is not represented in the figures.

The transverse beams 7 each consist of a round tubular body 21 and round flanges 22 at both extremities. The body 21 is also made of the aforementioned composite material, possibly by pulwinding or filament winding.

Pulwinding is a variant of pultrusion, whereby one or more layers of reinforcing fibres are wound on a mandrel, which layers, before and/or after being provided, are impregnated with the synthetic material, after which the whole is pulled through an extrusion element, after which the synthetic material hardens.

Filament winding is a method whereby reinforcing fibres or ribbons, impregnated with synthetic material, are wound onto a rotating mandrel or cylinder, after which the synthetic material hardens.

The flanges 22 are manufactured separately from the same composite material, preferably by means of the aforementioned "compression moulding", and are welded or glued to the extremities of the body 21, preferably with a two-component glue, such as epoxy glue.

Instead of separately formed flanges 22, the body 21 can be provided with an enlargement at both extremities, whereby the transverse beam 7 then can be manufactured in one piece.

The transverse beams 7 are fixed with their flanges 22 or the enlargement to a lateral flank 10 of a longitudinal beam 6, for example, glued with a flexible glue, such as a two-component glue, however, preferably, they are welded. Possibly, the connection still may be reinforced by bolts.

A transverse beam 7 may also be provided in the above-described manner between the parts of two opposite trestles 14 which protrude at the underside.

The obtained tubular construction of the longitudinal beams 6 provides for more light-weight beams with a particular resistance against torsion. The transverse beams 7 do not only keep the two longitudinal beams in place, but also take up the torsion forces of the chassis 3 in longitudinal direction.

The fact that the upper portion of the trestle 14 protrudes between the lateral flanks 10 of a longitudinal beam 6, allows for that this trestle 14 is welded or glued to two vertical lateral walls, which results in a very large contact surface and avoids a lumped load on the longitudinal beam 6.

If necessary, in the vicinity of the wheel axles 11, the longitudinal beams 6 can be reinforced at their lower sides by auxiliary longitudinal beams.

As the semitrailer 2 is of the type with a so-called swan-neck, the underside of the longitudinal beams 6, at the foremost part or front portion, is placed offset in upward direction in order to be situated above the rear part of the truck tractor 1. This is obtained by reducing height of the beams 6 at this foremost part.

Figure 4:
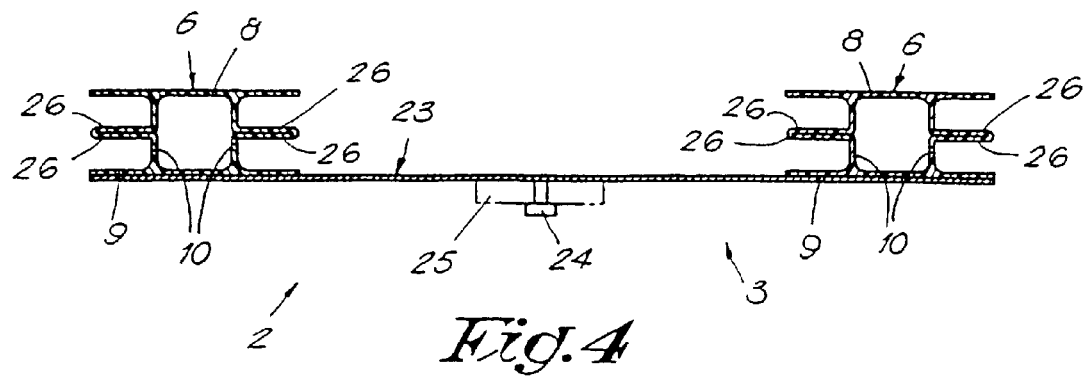

As represented in FIG. 4, the semitrailer 2 described heretofore may comprise a coupling plate 23 in front, consisting of the same composite material as the longitudinal beams 6, which plate is fixed to the underside of this latter, for example, welded thereto, and below carries the kingpin 24 with which the semitrailer 2 can be connected to the centre plate 25 of the truck tractor 1.

As the longitudinal beams 6 are made of a composite material with thermoplastic synthetic material, they can be brought into the aforementioned shape in a simple manner in order to form the swan-neck.

Figure 5:
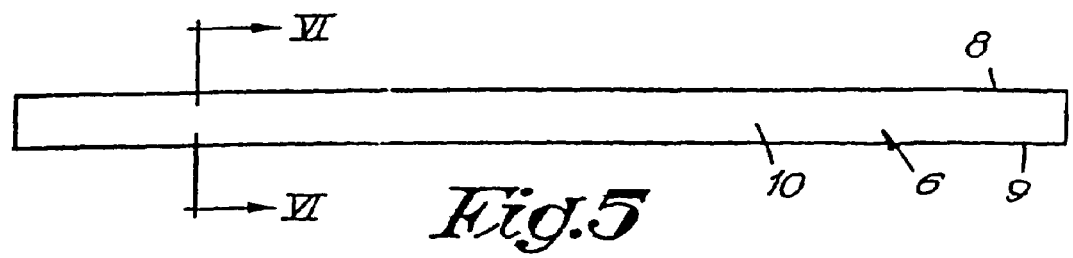
FIG. 5 represents a lateral view of a longitudinal beam used for manufacturing the undercarriage from the previous figures.
Figure 6:
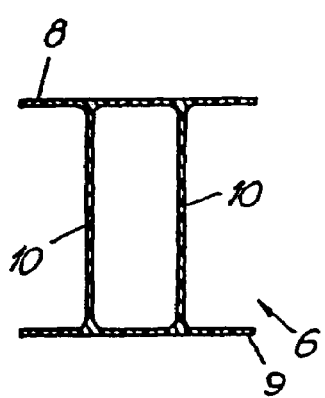
FIG. 6 represents a cross-section according to line VI—VI in FIG. 5.

In FIGS. 5 and 6, such longitudinal beam 6 with a profile made in one piece is represented in detail, such as it is manufactured first.

Figure 7:
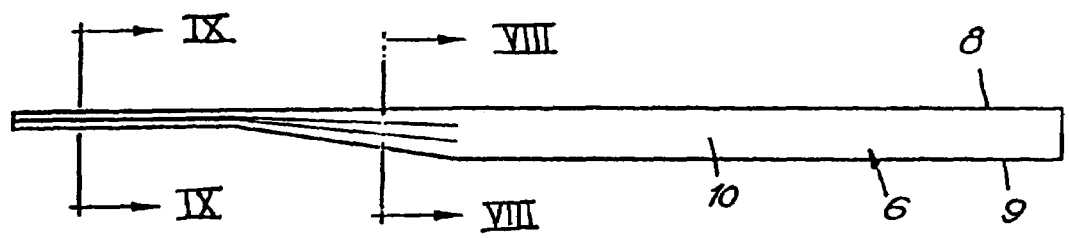
FIG. 7 represents a lateral view analogous to that of FIG. 5, however, after the longitudinal beam has been brought into the shape such as present in the undercarriage of FIGS. 1 to 4.
Figure 10:
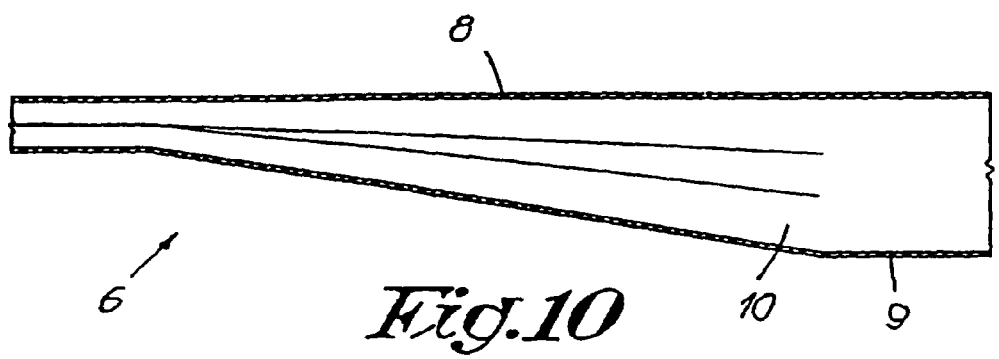
FIG. 10 represents a cross-section according to line X—X in FIG. 9.

Subsequently, the foremost part thereof is heated until the composite material can be deformed, after which on the foremost part the underside of the longitudinal beam 6 is deformed up into the aforementioned shape which is represented in detail in FIGS. 7 and 10.

This deformation is performed under pressure, whereby this pressure may be an external pressure which is exerted, for example, by an hydraulic press. This press pushes, for example, with a punch onto the lower flange 9, whereas the upper flange 8 is supported.

This external pressure may also be the atmospheric pressure in the case that a partial vacuum or vacuum is created in the hollow longitudinal beam 6.

Figure 8:
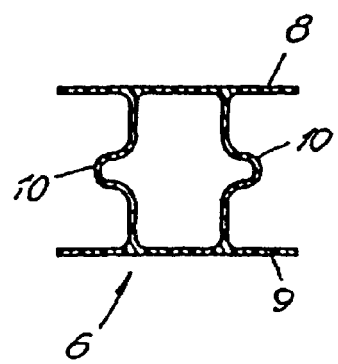
FIG. 8 represents a cross-section according to line VIII—VIII in FIG. 7.
Figure 9:
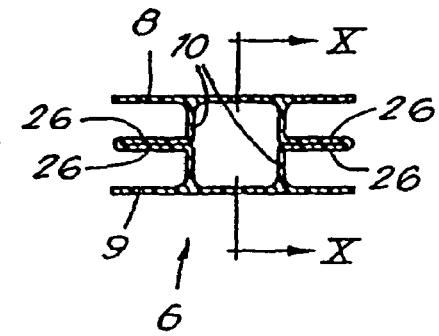
FIG. 9 represents a cross-section according to line IX—IX in FIG. 7.

In both cases, the two lateral flanks 10 of the core of the longitudinal beam 6, which can be deformed by the heat, will bent out, preferably outward, as represented in detail in FIGS. 8 and 9.

The deformation is such that side walls are laterally bent out until two adjacent longitudinal portions 26 of a lateral flank 10 are moved to each other. Once against each other, these portions are welded or glued to each other.

In order to weld these portions 26 to each other, a heating wire 27, for example a carbon wire, is incorporated in one of or in each of these portions 26. For welding the portions 26, an electrical current is sent through the wires 27.

It is obvious that the shape of the longitudinal beams 6 is not limited to the shown shape and that these beams 6 must not necessarily be I-profiles.

FIGS. 11 to 13 show a longitudinal beam 6 with a different shape, especially with a different transversal section, which is rectangular.

The decrease in height at the foremost part of the longitudinal beams 6 to form the swan-neck is obtained in the same manner as described here before and as shown in FIG. 12.

With such beams 6, the trestle 14 is not tubular but comprises two parallel plates 28 in thermoplastic material, the upper end of which is glued or welded to the lateral flanks 10 of a beam 6 as shown in FIG. 13.

The invention is in no way restricted to the forms of embodiment described heretofore and represented in the figures, on the contrary may such undercarriage be realised in different variants without leaving the scope of the invention.

The invention claimed is:

1. Undercarriage for a vehicle, which undercarriage is of the type with a swan-neck, and comprises at least two longitudinal beams the height of the foremost part of the longitudinal beams being reduced in height, said swan-neck being thus formed by a change in height of the longitudinal beams; at least one transverse beam and at least one wheel axle, wherein at least the longitudinal beams are made of a composite material consisting of synthetic material with reinforcing fibres, such that the synthetic material of the composite material, of which at least the longitudinal beams are made; is a thermoplastic synthetic material and the height of the foremost part of the longitudinal beams has a plastically deformed reduction in height;

wherein the longitudinal beams have two lateral flanks and, at the foremost part of these beams, the lateral flanks bend out or bulge, due to a thermoplastic deformation.

2. Undercarriage according to claim 1, characterised in that at the foremost part of the beams the lateral flanks bend out outwardly.

3. Undercarriage according to claim 1, characterised in that at the foremost part of the beams the lateral flanks bend out so that two adjacent longitudinal portions of each of the flanks are in contact with each other and preferably glued or welded together.

4. Undercarriage according to claim 1, characterised in that the synthetic material is polypropylene or polyamide.

5. Undercarriage according to claim 1, characterised in that also the transverse beam is manufactured of composite material with thermoplastic synthetic material.

6. Undercarriage according to claim 5, characterised in that the transverse beam is welded or glued with its extremities to the longitudinal beams.

7. Undercarriage according to claim 6, characterised in that the transverse beam is provided at its extremities with a flange or a thickening and is welded or glued to a lateral flank of the at least two longitudinal beams.

8. Undercarriage according to claim 1, characterised in that the wheel axle is connected to a longitudinal beam by trestles which are also made of composite material with thermoplastic synthetic material, the trestles being welded or glued to the longitudinal beams.

9. Undercarriage according to claim 8, characterised in that the longitudinal beams have two lateral flanks and in that a trestle protrudes with its upper extremity into the longitudinal beam, between the two lateral flanks, which extremity, with two flat side walls, is welded or glued to these lateral flanks.

10. Undercarriage according to claim 8, characterised in that the longitudinal beams have two lateral flanks and in that a trestle comprises two plates in thermoplastic material, which are welded or glued to the lateral flanks of each of the two longitudinal beams.

* * * * *